United States Patent [19]

Barberis et al.

[11] 4,317,195

[45] Feb. 23, 1982

[54] METHOD OF AND DEVICE FOR REDUCING SPEECH-REPRODUCTION IRREGULARITIES IN PACKET-SWITCHING TELECOMMUNICATION SYSTEMS

[75] Inventors: Giulio Barberis; Daniele Pazzaglia, both of Turin, Italy

[73] Assignee: CSELT-Centro Studi e Laboratori Telecommunicazioni S.p.A., Turin, Italy

[21] Appl. No.: 134,269

[22] Filed: Mar. 26, 1980

[30] Foreign Application Priority Data

Mar. 27, 1979 [IT] Italy ............................... 67628 A/79

[51] Int. Cl.³ .............................................. H04J 6/02
[52] U.S. Cl. ........................................ 370/94; 370/60
[58] Field of Search ................ 179/1 SC; 370/60, 61, 370/92, 94; 340/147 R, 147 SY; 178/3

[56] References Cited

U.S. PATENT DOCUMENTS

| | | | |
|---|---|---|---|
| 3,663,172 | 1/1972 | Eggimann et al. | 370/94 |
| 4,017,688 | 4/1977 | Callens et al. | 370/60 |
| 4,079,209 | 3/1978 | Schwerdtel | 370/60 |
| 4,100,377 | 7/1978 | Flanagan | 370/94 |

FOREIGN PATENT DOCUMENTS 54-141504  11/1979  Japan .................................. 370/94

Primary Examiner—Gerald L. Brigance
Attorney, Agent, or Firm—Karl F. Ross

[57] ABSTRACT

Two mutually independent clocks at a transmitting node and a receiving node of a routing network in a packet-switching telephone system are correlated by a synchronizing device associated with the receiving node whose processor, at the beginning of voice transmission between the two nodes, decodes a label of an incoming packet to determine its time of departure $t_s$ from the transmitting node whereupon a control unit at the receiving node adjusts the local clock in conformity with an estimated reading $t_x$ of the remote clock. This adjustment takes into account only fixed network parameters determining a minimum transit time for the packets by introducing a basic delay $T_d$. After the correlation, an initial packet of a sequence representing a period of coherent speech —termed talkspurt—is stored for a time sufficient to augment the basic delay $T_d$ by a supplemental time lag $T_\lambda$ between its emission at the transmitting node and its insertion into an outgoing queue of the receiving node, time lag $T_\lambda$ being at least equal to an average random delay $d_t$ actually superimposed upon the basic delay by variable network parameters such as traffic density; this minimizes the incidence of gaps in a talkspurt and major variations of pauses between talkspurts as perceived by a receiving subscriber.

8 Claims, 3 Drawing Figures

METHOD OF AND DEVICE FOR REDUCING SPEECH-REPRODUCTION IRREGULARITIES IN PACKET-SWITCHING TELECOMMUNICATION SYSTEMS

FIELD OF THE INVENTION

Our present invention relates to a method of reducing speech irregularities at the receiving end of a telecommunication (especially a telephone) system of the packet-switching type, resulting from random delays in packet transmission, and to a device for implementing that method.

BACKGROUND OF THE INVENTION

In packet-switching telecommunication systems used for speech transmission, voice samples from a talking subscriber are digitally coded and organized into so-called packets before being emitted by a first or transmitting node, connected to the talking subscriber, to a second or receiving node, connected to a listening subscriber, via a routing network interlinking these two terminal nodes. Generally, the packets are of identical length and carry coded headings or labels containing supervisory information such as origin and destination. During periods of coherent speech, referred to hereinafter as talkspurts, the packets follow one another in a continuous sequence at the transmitting node; because of random delays due particularly to variations in traffic density within the routing network, however, these sequences are liable to be disrupted upon arrival at the receiving end. To facilitate the restoration of their continuity at the second node, the packets of a sequence are advantageously labeled with individual identification codes such as serial numbers with the aid of a talkspurt detector at the first node which monitors the digitized voice samples to determine their continuity. Even so, however, the art has not successfully solved the problem of eliminating or at least reducing the incidence of perceptible gaps in the reproduced talkspurts and preventing substantial alterations in the length of intervening pauses.

OBJECTS OF THE INVENTION

An object of our present invention, therefore, is to provide an efficient method of minimizing the speech-reproduction irregularities due to these random delays in order to let the speaker's voice come through more naturally at the receiving end.

A related object is to provide a device associated with the receiving node of such a system for implementing that method.

SUMMARY OF THE INVENTION

In accordance with our present invention, the time of departure of each packet from a first or transmitting node on its way to a second or receiving node is determined at the latter node from labels carried by incoming packets, such time of departure being registered at the first node by a transmission clock which is independent of a reception clock at the second node; the two clocks, however, are assumed to operate at essentially the same rate. On the basis of this departure time and of a minimum transit time established by substantially invariable parameters of the routing network interlinking the two nodes, the reading of the reception clock is correlated with that of the transmission clock at the beginning of voice communication between the two nodes, i.e. of a telephone conversation between a talking subscriber connected to the first node and a listening subscriber connected to the second node. This correlation, or presumptive clock synchronization, will generally occur upon the arrival of the first few packets of a sequence of such packets representing the first talkspurt of the conversation moving in the direction of traffic here considered, the packets of any such sequence being labeled wth identification codes as noted above. After correlation or presumptive synchronization of the two clocks has been achieved, and in the course of the same voice communication or telephone call, the (apparent) actual delay undergone by an initial packet of such a sequence is ascertained from the reading of the reception clock and from the label of that packet. This actual delay is then compared with a minimum overall delay, obtained by adding a supplemental time lag to the minimum transit time, whereupon the initial packet is stored at the second node for a limited time equal to the difference between the minimum overall delay and the actual delay in case the former exceeds the latter. Otherwise, i.e. if the actual delay equals or exceeds the minimum overall delay, the initial packet is immediately released into an output queue of the second node. In any event, subsequent packets of a sequence are also released immediately, i.e. after a retention time which is negligible compared with the average waiting time in the output queue, so that all the packets of a sequence closely follow one another on leaving that node.

The supplemental time lag added to the basically fixed minimum transit time depends on time-varying parameters of the routing network, such as traffic density, monitored by a processor at the receiving node which also scans the labels of the incoming packets and feeds a count of the packets of any sequence to a memory register of a device designed to implement the method according to our invention. This device further comprises a buffer store for the temporary retention of each incoming packet, at least for a brief period as discussed above. The release of each packet into the output queue of the second node is commanded by a control unit which also instructs arithmetic circuitry, forming part of that device, to correlate the reading of the reception clock with that of the transmission clock on the basis of the minimum transit time and the departure time of a given packet, at the beginning of voice communication between the two nodes, and thereafter to calculate the actual delay undergone by an initial packet present in the buffer store and to read out the aforementioned difference between that actual delay and the minimum overall delay if the latter exceeds the former. The identity of an initial packet of a sequence is established by recognition means receiving the count of that packet from the memory register containing same; the recognition means may be a comparator with inputs connectable to that register and to an ancillary memory holding the count of an immediately preceding packet. All the other data needed by the arithmetic circuitry to perform these operations are also fed to memory registers by the processor or are more or less permanently stored in such registers, depending on their nature. Besides the supplemental time lag established by the processor and the minimum transit time based on fixed network parameters, these data may include an acquisition period identical for all packets and equal to the time needed for generating each packet at the first node. By multiplying the acquisition period with the count of a packet currently held in the buffer store, and adding the resulting product to the departure time of an initial packet, the arithmetic circuitry can determine the departure time of a subsequent packet of the sequence; this information, added to the minimum transit time stored in one of the memory registers, provides a minimum time lapse between the departure of the initial packet and the arrival of the subsequent packet. Whenever that minimum time lapse happens to exceed the reading of the reception clock at the instant of arrival of such a subsequent packet (e.g. because the reception clock, already correlated with the transmission clock, runs slower than the latter), the correlation can be updated by making the reading of the reception clock equal to this time lapse.

BRIEF DESCRIPTION OF THE DRAWING

The above and other features of our present invention will now be described in detail, reference being made to the accompanying drawing in which.

SPECIFIC DESCRIPTION

Figure 1:
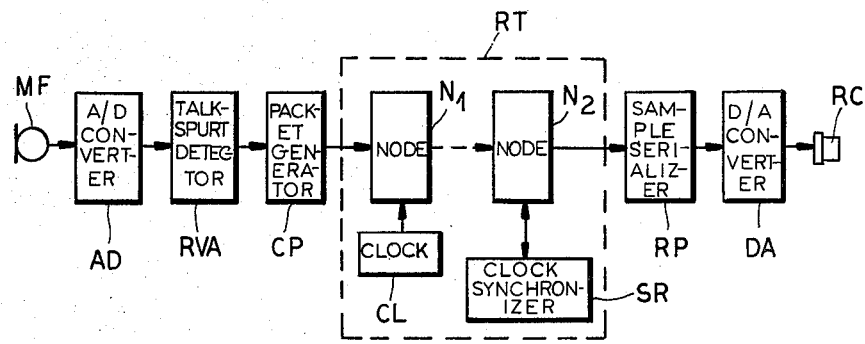
FIG. 1 is a block diagram of a packet-switching telecommunication system, showing a clock-synchronization and delay-equalizing device according to our present invention connected to a receiving node.

As described in commonly owned U.S. patent application Ser. No. 120,109, filed Feb. 8, 1980 by one of us, Giulio Barberis, jointly with two others, a packet-switching telecommunication system comprises a multiplicity of packet-routing nodes transmitting pulse-code-modulated (PCM) messages between different pairs of subscriber stations. Such a telecommunication system is schematically illustrated in FIG. 1. A microphone transducer MF at a transmitting station is connected to a first terminal node $N_1$ of a routing network RT via an analog-to-digital converter AD for transforming voice signals into PCM signals, a talkspurt detector RVA determining the absence of phonetic and expressive pauses in a period of a continuous speech, and a packet generator CP for organizing PCM samples from converter AD and detector RVA into data packets having a predetermined number of bits and, hence, a constant duration. Each packet can consist, for example, of 256 PCM samples corresponding to 32 msec of conversation and control data including a designation of its destination and a serial number k which increases by 1 for the consecutive packets of a sequence coding the voice signals of a talkspurt. An initial packet of such a sequence includes a label indicating in binary form the departure time $t_s$ of such initial packet from node $N_1$ as read on a transmitting clock CL.

The packet sequences coding the voice signals generated by microphone MF are transmitted in network RT to a second terminal node $N_2$ which is connected to an earpiece or speaker RC at a receiving station via a serializer RP, which reorganizes the successive PCM samples from incoming packet sequences, and via a digital-to-analog converter DA changing the PCM bit groupings into voice signals. The total travel time for each packet from node $N_1$ to node $N_2$ includes a basic delay or minimun transit time $T_d$ determined by the physical characteristics of routing network RT, such as switching times and the lowest number of intervening nodes between terminal nodes $N_1$ and $N_2$, and a random delay $t_d$ varying largely in accordance with instantaneous traffic levels in network RT. In order to minimize speech-reproduction irregularities due to this random delay, node $N_2$ is provided with a clock synchronizer SR also acting as a delay equalizer.

Figure 2:
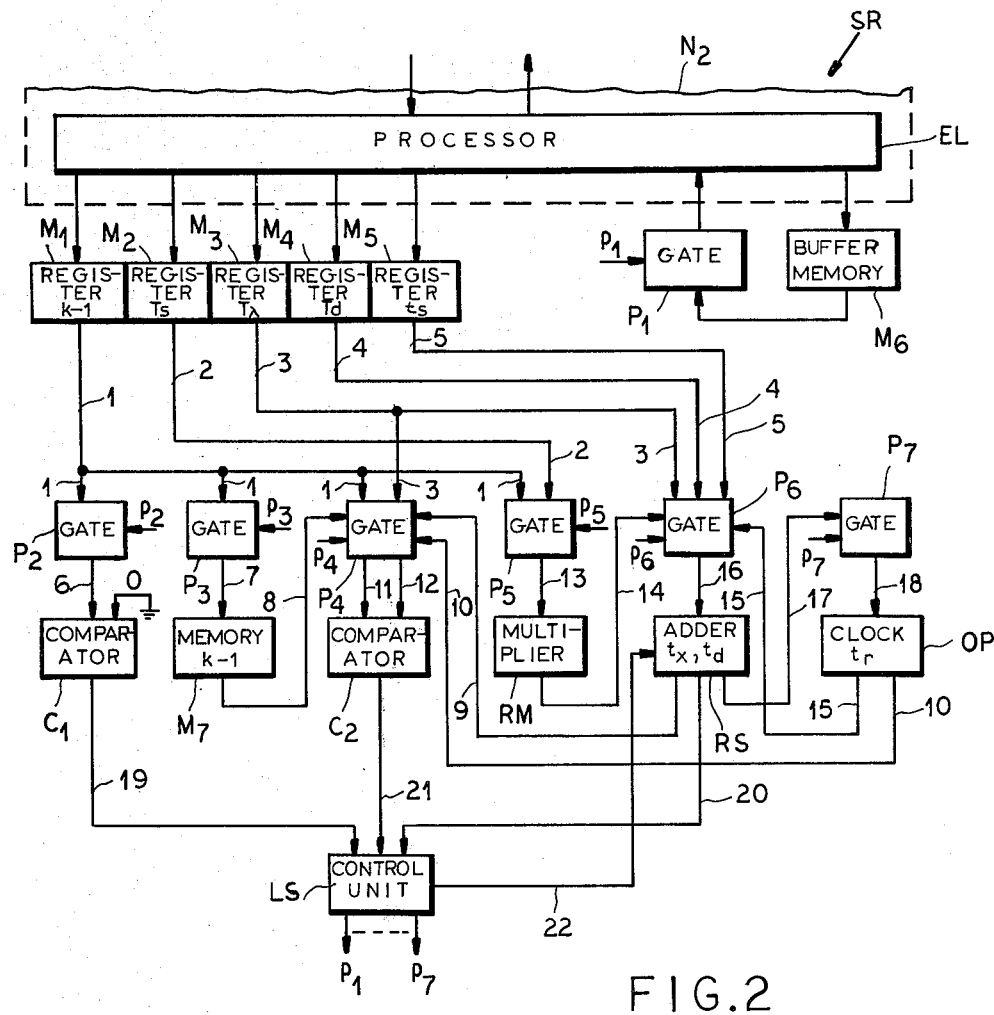
FIG. 2 is a block diagram of the clock synchronizer and delay equalizer shown in FIG. 1.

As shown in FIG. 2, the device SR embodying our present invention includes a buffer memory $M_6$ with an input connected to a processor EL of node $N_2$ which, in a manner described in commonly owned application Ser. No. 120,109 whose disclosure is hereby incorporated by reference into the present application, directs the arriving packets to their destinations. Memory $M_6$, receiving such incoming packet for temporary storage, has an output leading back to processor EL via a logic gate $P_1$ for forwarding a currently stored packet to an output queue of node $N_2$ upon the transmission of an enabling signal $P_1$ to gate $P_1$ from a control unit LS designed as a programmable logic circuit. An associated working memory consists of a bank of registers $M_1-M_5$ connected to processor EL for temporarily storing information pertaining to the packet currently stored in memory $M_6$. Registers $M_4$, $M_5$ store the basic delay $T_d$ and the departure time $t_s$, respectively, while register $M_1$ contains the serial number k of the currently stored packet diminished by one, i.e. a count $K-1$ assigned to that packet. Register $M_2$ memorizes an acquisition period $T_s$ corresponding to the time necessary to generate exactly one packet on an output of the originating node $N_1$. This period is constant for the entire routing network RT, i.e. identical for every node and every packet of the same length, and is also equal to the time required by any node to receive a packet.

Register $M_3$ stores a supplemental time lag $T_\lambda$ assigned to the initial packet of every sequence. Time lag $T_\lambda$ is determined by processor EL in accordance with current traffic conditions in routing network RT, communicated to node $N_2$ in the form of delay estimates calculated by various nodes of that network, as described in the above-identified commonly owned application.

Register $M_1$ is tied via an output lead 1 to four logic gates $P_2-P_5$ enabled by corresponding signal $P_2-P_5$ from control unit LS, gates $P_4$, $P_5$ having further data inputs respectively connected to output leads 3, 2 of registers $M_3$, $M_2$. Gate $P_2$ works via a lead 6 into a comparator $C_1$ having a grounded reference input 0; upon detecting zero-level contents of register $M_1$, signifying the storage in memory $M_6$ of an initial packet in a sequence, comparator $C_1$ emits a recognition signal on a lead 19 extending to control unit LS. Gate $P_3$ transfers the count $K-1$ from register $M_1$ to an ancillary memory $M_7$ via a lead 7 upon receiving its enabling signal $P_3$.

Memory $M_7$ transmits the count $K-1$ to gate $P_4$ via a lead 8, this gate also having input leads 9 and 10 extending from an adder RS and from a local clock OP provided with a settable counter of fast timing pulses. Under the control of switching signal $P_4$, gate $P_4$ selectively connects a combination of two input leads 1 and 8, 9 and 10 or 9 and 3 to a pair of output leads 11, 12 working into a comparator $C_2$ which is in turn coupled to control unit LS via a lead 21. Comparator $C_2$ informs the control unit whether numerals coded by signals on leads 11, 12 are equal or, if they are unequal, which one is greater. Thus, whenever register $M_1$ and memory $M_7$ are connected to leads 11 and 12, a signal generated on lead 21 by comparator $C_2$ indicates to control unit LS whether memory $M_6$ currently contains a new packet and, if so, whether the same is the first packet of a new sequence, i.e. whether the count $K-1$ assigned to it is lower than that of the immediately preceding packet.

In response to a pulse $P_5$, gate $P_5$ transmits the count $K-1$ from register $M_1$ and the acquisition period $T_s$ from register $M_2$ by way of a conductor pair 13 to a multiplier RM which forms a product $T_s(k-1)$ fed to a logic gate $P_6$ via a lead 14, this product being the length of the interval from the departure time $t_s$ of the initial packet in a sequence to the departure time of the $k^{th}$ packet. Gate $P_6$ receives, in addition to the inter-packet interval $(k-1) \cdot T_s$ and a switching signal $P_6$ from control unit LS, signals from register $M_3$, $M_4$, $M_5$ and clock OP via leads 3, 4, 5 and 15. These signals respectively code the supplemental time lag $T_\lambda$, the basic delay $T_d$, the departure time $t_s$ of the initial packet in a current sequence, and a reception-clock reading $t_r$. Clock OP is controlled by unit LS to begin counting time $t_r$ from a zero instant $t_0$ corresponding to the arrival of a first packet in a series of call-coding sequences; during the transmission by node $N_2$ of packet sequences associated with a single telephone conversation, the reading $t_r$ of reception clock OP is recurrently updatable by control unit LS to equal the estimated arrival times $t_x$ of the packets in a sequence, as referred to the starting time $t_s$ and thus to the transmission clock CL of the originating node $N_1$; the two clocks, while operating independently of each other, are assumed to advance at essentially identical rates.

Upon the storage of a new packet in memory $M_6$, gate $P_6$ is switched by signal $P_6$ to connect leads 4, 5 and 14 via a lead 16 to adder RS which thereupon calculates an earliest arrival time $t_x$ for the new packet by forming the sum:

$$t_x = T_d + T_s(k-1) + t_s \quad (1)$$

whose first two terms represent the minimum time lapse between instant $t_s$ and the arrival of the packet. Time $t_x$, constituting the earliest instant of reception of the new packet by node $N_2$, thus depends on the departure time $t_s$ of the initial packet in the current sequence, the interval $T_s(k-1)$ required to generate or acquire the $2^{nd}$ through $k^{th}$ packets of this sequence, and the minimum transit time $t_d$ for packets traveling from node $N_1$ to node $N_2$. Equation (1) assumes that the first $k$ packets of the current sequence have been emitted without interruption from node $N_2$ and that the random delay for the $k^{th}$ packet is insignificant.

Adder RS is provided with holding registers for storing coded numerical values received from registers $M_4$, $M_5$ and from multiplier RM as well as temporarily memorizing the estimation $t_x$ upon the calculation thereof. If a new packet is determined by comparator $C_2$ to be the initial one in a sequence, control unit LS switches the gate $P_6$ to connect lead 15 to lead 16 whereby adder RS receives a current clock reading $t_r$ for calculating an apparent additional random delay $t_d$ experienced by the initial packet:

$$t_d = t_r - t_x \quad (2)$$

Adder RS is designed to substract, upon receiving the encoded time lag $T_\lambda$ from register $M_3$ under the control of signal $P_6$, the random delay $t_d$ from time lag $T_\lambda$ to determine a residual delay or extended storage time $t_\lambda$ whose magnitude is read out to control unit LS via lead 20. Unit LS then enables the insertion of the current initial packet from memory $M_6$ into an output queue of node $N_2$ only upon the elapse of this residual delay $t_\lambda$, or immediately if $t_d \geq T_{80}$, as described more fully hereinafter. A lead 22 extends from unit LS to a control input of adder RS.

Figure 3:
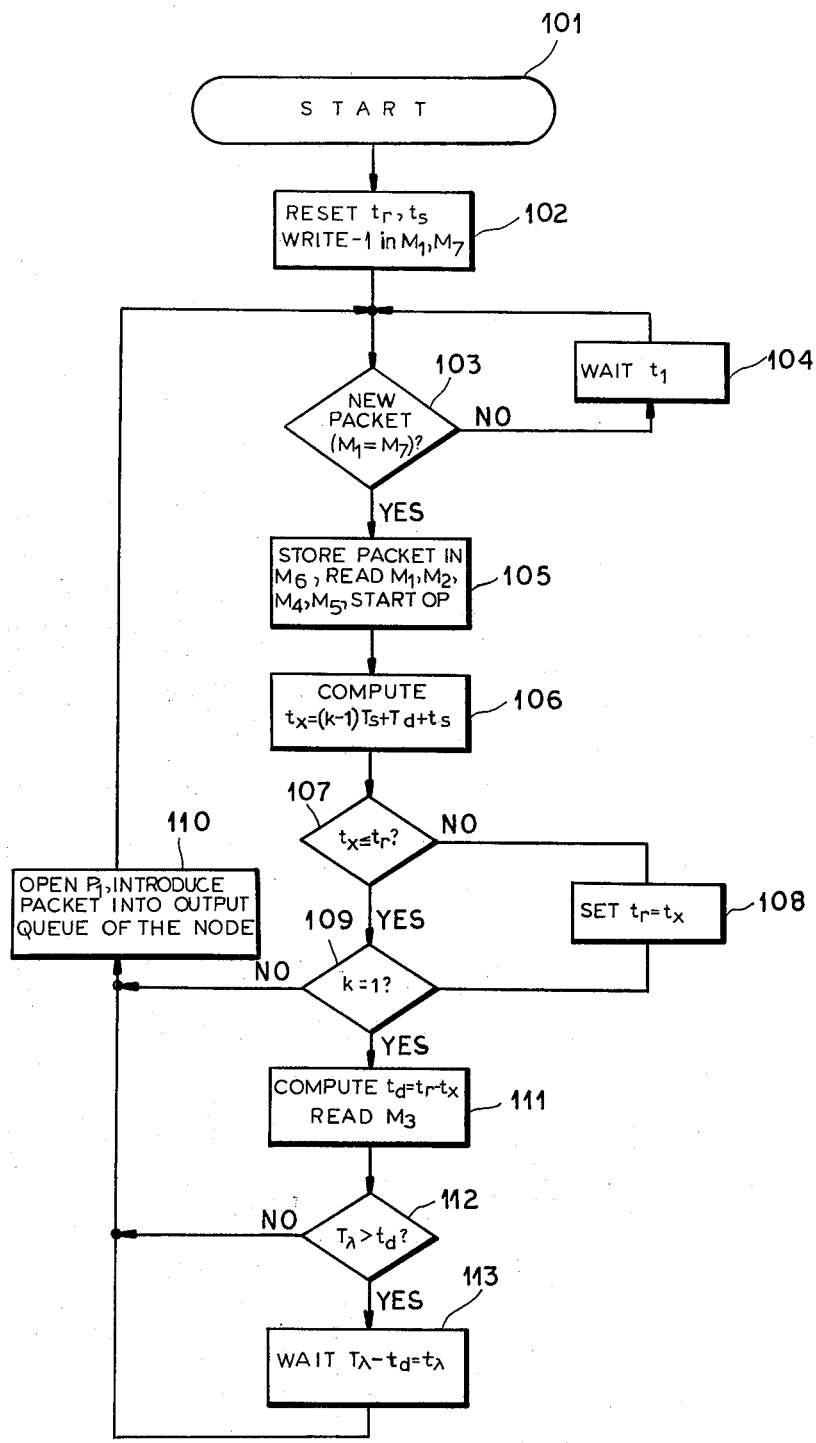
FIG. 3 is a flow-chart diagram indicating the operation of the circuitry of FIG. 2.

The operation of the device SR shown in FIGS. 1 and 2 will now be described with reference to the flow-chart diagram of FIG. 3. Upon start-up 101, or upon the end of a previous conversation, gate $P_3$ is open and gate $P_4$ connects its output leads 11, 12 to input leads 1, 8. In a step 102, processor EL loads registers $M_1$ and $M_5$ with values "$-1$" and "0," respectively; gate $P_3$ transfers the contents of register $M_1$ to memory $M_7$ while the setting of register $M_5$—communicated via gate $P_6$, adder RS and gate $P_7$ to clock OP—establishes a reception time $t_r$ of zero. In response to an equality signal on lead 21, control unit LS periodically explores the output of comparator $C_2$ with a recurrence period $t_1$ to determine whether a packet has arrived; this is represented in FIG. 3 by a decision junction 103 and a step 104. Gates $P_1$–$P_7$ are closed at this stage.

Upon the arrival of an incoming packet of node $N_2$, processor EL respectively loads registers $M_1$, $M_3$–$M_5$ with the packet count $k-1$, the time lag $T_\lambda$, the basic delay $T_d$ and the departure time $t_s$. Time lag $T_\lambda$ may be chosen equal to or greater than the average random delay $t_d$ of network RT as determined by processor EL. The serial number $k$ and the departure time $t_s$ are included in the heading information supplied with the incoming packet, while the supplemental time lag $T_\lambda$ and the basic delay $T_d$ may be calculated by processor EL according to the aforementioned fixed and variable network characteristics such as the smallest number of intervening nodes and the existing average traffic density. Acquisition period $T_s$ is constant throughout the routing network RT and may be quasi-permanently written in register $M_2$. Generally, the packet first to arrive at node $N_2$ at the beginning of a conversation will bear the serial number $k=1$, though an irregularity in transmission may cause a loss of this first packet. With each new arrival the count $k-1$ is incremented while the contents of registers $M_2$–$M_5$ will remain substantially unchanged throughout each sequence. Departure time $t_s$, which has the same value for each packet of the sequence, will be updated for each sequence of a series of sequences occurring in the course of a conversation, i.e. upon the reception of each initial packet after the first sequence.

If the logic circuit of control unit LS makes an affirmative decision at junction 103, i.e. if a new packet has been received by node $N_2$ and stored in memory $M_6$, unit LS emits in a step 105 a gating pulse $P_5$ enabling the transfer of count $k-1$ and acquisition time $T_s$ to multiplier RM which calculates the interval $T_s(k-1)$. Simultaneously, unit LS reopens gate $P_3$ to write the contents of register $M_1$ into memory $M_7$ while gate $P_6$ is switched to connect first the lead 4 and then the lead 5 to adder RS for forming the sum $T_d + t_s$. If the newly received packet is the first packet in a call-coding series of talk-spurt sequences, the control unit emits a gating pulse $p_7$ for starting the local clock OP.

In a subsequent step 106, after the termination of gating pulse $P_7$, the output lead 14 of multiplier RM is connected to adder input 16 for calculating the estimated time of arrival $t_x$ of a newly received packet according to equation (1). Next, gate $P_4$ is switched by control unit LS to connect adder RS and clock OP to comparator $C_2$. Unit LS then explores in an inquiry step 107 the signal on lead 21 to determine the relative magnitude of clock reading $t_r$ and estimated arrival time $t_x$. If the time $t_r$ measured by clock OP is less than the estimated arrival time, as will generally be the case upon reception of the first packet after the start-up at time $T_0$, gate $P_7$ is reopened to reset clock OP in a synchronization step 108 making $t_x = t_r$. This resetting of clock OP serves to correlate same with the transmission clock CL at node $N_1$. Synchronization may be presumed to have been attained with reception of only a few packets in the first sequence of a series.

After checking the synchronization of clock OP at step 107, unit LS determines in an inquiry 109 whether or not the newly received packet is an initial one bearing the serial number $k=1$. Enabling pulse $P_2$ applied to gate $P_2$ feeds the count $k-1$ from register $M_1$ to comparator $C_1$ which energizes lead 19 in the event that $k-1=0$. Otherwise, low voltage on lead 19 induces control unit LS to generate in a step 110 a pulse $P_1$ enabling gate $P_1$ to transmit the current packet from memory $M_7$ to the output queue of node $N_2$. If, however, lead 19 is found at inquiry 109 to be energized, gate $P_6$ is switched to transmit the reading $t_r$ of clock OP to adder RS which thereupon calculates in a step 111 the random delay $t_d$ according to equation (2). Under the control of unit LS, random delay $t_d$ and supplemental time lag $T_\lambda$ are then transmitted via gate $P_4$ to comparator $C_2$. At a decision junction 112, control unit LS explores the comparator output 21 to determine the relative magnitudes of times $T_\lambda$ and $t_d$. If the random delay $t_d$ is equal to or greater than the lag $T_\lambda$, the packet stored in memory $M_7$ is immediately transferred to the output queue of node $N_2$ (step 110). If, with $k=1$, delay $t_d$ is less than the lag $T_\lambda$ fed in by the processor, adder RS is commanded by control unit LS via connection 22 to calculate the residual $T_\lambda - t_d = t_\lambda$ (with $t_d$ possibly equal to 0) and to supply that delay to a nonillustrated comparator inside the unit where an ancillary clock (also not shown) is started to measure its elapse in a waiting step 113 after which unit LS executes step 110 by emitting the gating pulse $P_1$.

From equaton (1) it follows that, with $k=1$, the earliest arrival time of an initial packet is $T_d + t_s$. As long as the random delay $t_d$ does not exceed the time lag $T_\lambda$, the overall delay between the instant of emission $t_s$ of that packet at node $N_1$ and its reintroduction into the communication path at node $N_2$ will be $T_d + T_\lambda$. Only with larger values of $t_d$ will that overall delay be increased so as to broaden the pause between talkspurts as heard by the receiving subscriber. Thus, a suitable choice of time lag $T_\lambda$ will maintain the spacing of speech elements on reception virtually the same as on transmission. A method of computing a minimum average delay has been described in a paper titled "A New Routing Algorithm for Computer Communication Networks" by Guilio Barberis and Giorgio Micca, IEEE publication of August 1978, pages 27.5.1 to 27.5.5, presented at ICC '78 Congress.

The brief storage period of later packets of a sequence in buffer memory $M_6$ is negligible in comparison with the time of waiting in the outgoing queue of node $N_2$. Unless there occurs an abnormally large increase in delay $t_d$ during the sequence, these later packets will closely follow one another in the queue.

The extended storage time $t_\lambda = T_\lambda - t_d$ can also be regarded as the difference between a minimum overall delay $T_d + T_\lambda$ and the actual delay $T_d + t_d$ undergone by any initial packet in transit from node $N_1$ to node $N_2$.

The aforedescribed ability of comparator $C_2$ to detect a count in register $M_1$ lower than that in ancillary memory $M_7$ allows the control unit LS to treat an initial packet of a sequence other than the first sequence of a conversation in the manner discussed above, i.e., with determination of actual delay $t_d$ according to equations (1) and (2) and extended storage in step 113, even if the first packet or packets got lost so that $k \neq 1$. In that case, of course, the decision step 109 would have to be modified to inquire whether the count in register $M_1$ is less than that in memory $M_7$ held over from the end of the previous sequence.

We claim:

1. A method of minimizing irregularities in the transmission of speech signals by packets of digitally coded voice samples originating at a first node and arriving at a second node of a routing network in a telecommunication system in which periods of coherent speech are translated into respective sequences of packets labeled with identification codes under the control of a transmission clock at the first node and are arrayed into an outgoing queue at the second node under the control of a reception clock independent of said transmission clock but operating at substantially the same rate, said packets of identical length and being subjected to variable delays in traveling from said first node to said second node, comprising the steps of:
determining at the second node, from labels carried by incoming packets, the time of departure of each packet from the first node as measured by said transmission clock;
correlating the reading of said reception clock with that of said transmission clock at the beginning of voice communication between said nodes on the basis of said departure time and a minimum transit time established by substantially invariable network parameters;
ascertaining from the departure time of an initial packet of a sequence thereafter arriving as part of said voice communication, and from the reading of the arrival time on the reception clock correlated with the transmission clock, an actual delay undergone by said initial packet;
comparing said actual delay with a minimum overall delay obtained by adding a supplemental time lag to said minimum transit time;
storing said initial packet at the second node for a limited time equal to the difference between said minimum overall delay and said actual delay upon the former exceeding the latter;
releasing the initial packet at the end of said limited time to the output queue of the second node; and
passing each subsequent packet of the same sequence to said output queue immediately upon arrival at the second node.

2. A method as defined in claim 1 wherein the time of departure of each packet of a sequence other than said initial packet is determined by counting the number of packets following the initial packet, multiplying said number by an acquisition period identical for all packets and equal to the time needed for generating each packet at the first node, and adding the resulting product to the time of departure of said initial packet as decoded from a label thereof.

3. A method as defined in claim 1 or 2 wherein the reading of said reception clock is made equal to a minimum time lapse between the departure of the initial packet and the arrival of a subsequent packet of a sequence whenever said time lapse exceeds the reading of said reception clock at the instant of arrival of said subsequent packet.

4. In a telecommunication system wherein speech signals from a talking subscriber connected to a first node, destined for a listening subscriber connected to a second node which is linked with the first node by a routing network, are translated into digitized voice samples forming packets of identical length emitted by the first node under the control of a transmission clock and arrayed at the second node into an outgoing queue under the control of a reception clock independent of said transmission clock but operating at substantially the same rate, with translation of periods of coherent speech into respective sequences of packets labeled with identification codes indicating their order of succession in each sequence, the combination therewith of circuitry at said second node comprising:

a buffer store for temporarily retaining each incoming packet;

memory means for registering (a) data relating to the time of departure of each packet from the first node as measured by said transmission clock, obtained from information including said identification codes accompanying said packets (b) a minimum transit time established by substantially invariable parameters of said routing network, and (c) a supplemental time lag based upon time-varying parameters of said routing network;

arithmetic means connected to said memory means and to said reception clock for correlating the reading of the latter with that of said transmission clock on the basis of said minimum transit time and of the departure times of packets arriving at said second node at the beginning of voice communication between said nodes, said arithmetic means being operable after the correlation of the readings of said clocks to calculate an actual delay undergone by a packet of said voice communication in said buffer store from the departure time thereof and from the reading of said reception clock at the instant of arrival of the respective packet, and further to subtract said actual delay from a minimum overall delay constituted by the sum of said minimum transit time and said supplemental time lag whenever said minimum overall delay exceeds said actual delay;

recognition means connected to said memory means for detecting an initial packet sequence in said buffer store from the accompanying identification code;

programmed control means connected to said recognition means and to said arithmetic means for commanding, in the presence of an initial packet in said buffer store following correlation of the readings of said clocks, the calculation of said actual delay and, upon said actual delay being less than said minimum overall delay, a readout of the difference thereof; and gating means under the command of said control means coupled to said buffer store for releasing said initial packet from said buffer store into the output queue of said second node only after an extended storage time equal to said difference unless said actual delay is at least equal to said minimum overall delay, said control means being responsive to said recognition for commanding the immediate release of any packet other than an initial one received in said buffer store.

5. The combination defined in claim 4 wherein said second node includes a processor scanning the labels of incoming packets for feeding to said memory means the departure time of the initial packet of each sequence and a count of each packet of a sequence along with said supplemental time lag, said memory means including a first register containing the count of a packet currently residing in said buffer store, a second register storing an acquisition period identical for all packets and equal to the time needed for generating each packet at said first node, a third register containing said supplemental time lag, a fourth register storing said minimum transit time, and a fifth register holding the departure time of the initial packet for the duration of the corresponding sequence.

6. The combination defined in claim 5 wherein said arithmetic means comprises a multiplier connectable to said first and second registers for calculating a product of said count times said acquisition period and an adder connectable to said multiplier and to said fifth register for summing said product and the departure time of the initial packet to determine the departure time of each subsequent packet in a sequence, said adder being further connectable to said reception clock and to said third and fourth registers for calculating said actual delay and subtracting same from said supplemental time lag to determine said difference, said reception clock resettable by the total of the contents of said fourth and fifth registers and said product read out from said adder upon said total exceeding the reading of said reception clock.

7. The combination defined in claim 5 or 6 wherein said recognition means comprises an ancillary memory connectable to said first register for receiving the count thereof and comparison means with input connections to said first register and to said ancillary memory for detecting a diversity of their contents.

8. The combination defined in claim 7 wherein said comparison means includes a comparator with a fixed reference input for detecting the arrival of a first packet of a voice communication from the disappearance of a negative count fed by said processor into said first register in the absence of such communication.

* * * * *